United States Patent
Leger (10) Patent No.: US 9,624,965 B2
(45) Date of Patent: Apr. 18, 2017

(54) LOCKING ACTUATOR STEM AND ROD END BEARING APPARATUS FOR USE WITH FLUID VALVES

(71) Applicant: Fisher Controls International LLC, Marshalltown, IA (US)

(72) Inventor: Bryan Quinn Leger, Marshalltown, IA (US)

(73) Assignee: Fisher Controls International LLC, Marshalltown, IA (US)

(*) Notice: Subject to any disclaimer, the term of this patent is extended or adjusted under 35 U.S.C. 154(b) by 0 days.

(21) Appl. No.: 14/716,500

(22) Filed: May 19, 2015

(65) Prior Publication Data

US 2015/0247527 A1    Sep. 3, 2015

Related U.S. Application Data (63) Continuation of application No. 12/499,389, filed on Jul. 8, 2009, now Pat. No. 9,062,794.

(51) Int. Cl.
  *F16C 7/02* (2006.01)
  *F16K 31/165* (2006.01)
  (Continued)

(52) U.S. Cl.
  CPC .............. *F16C 7/02* (2013.01); *F16K 31/16* (2013.01); *F16K 31/1655* (2013.01);
  (Continued)

(58) Field of Classification Search
  CPC ..................................... F16B 7/06; F16B 7/18
  (Continued)

(56) References Cited

U.S. PATENT DOCUMENTS 1,072,425 A    9/1913    Candee
1,585,479 A    5/1926    Fisher
(Continued)

FOREIGN PATENT DOCUMENTS

DE    1625548    9/1970
JP    3710304    5/1962
(Continued)

OTHER PUBLICATIONS

Emerson Process Management, "Type 1051 and 1052 Diaphragm Rotary Actuators," Product Bulletin, May 2007, 12 pages.
(Continued)

*Primary Examiner* — Victor MacArthur
(74) *Attorney, Agent, or Firm* — Hanley, Flight & Zimmerman, LLC (57) ABSTRACT

Actuator stem and rod end bearings having locking mechanisms are described. An example apparatus for use with a control valve actuator includes a rod end bearing having a bearing retainer and a shaft portion extending from the bearing retainer, where the shaft portion defines a first face. An actuator stem has a first end to be operatively coupled to a diaphragm plate of the control valve actuator and a second end to be coupled to the rod end bearing, where the second end defines a second face. The first face engages the second face to provide a lock that prevents rotation of the actuator stem relative to the rod end bearing when the actuator stem is rotated in a first direction.

18 Claims, 8 Drawing Sheets

(51) Int. Cl.
*F16K 31/16* (2006.01)
*F16B 39/02* (2006.01)

(52) U.S. Cl.
CPC .......... *F16B 39/02* (2013.01); *F16C 2226/60* (2013.01); *F16C 2361/91* (2013.01); *Y10T 403/142* (2015.01); *Y10T 403/49* (2015.01); *Y10T 403/556* (2015.01)

(58) Field of Classification Search
USPC .......... 403/118, 329, 292–320; 251/61, 61.2, 251/61.4, 331, 335.2; 411/329
See application file for complete search history.

(56) References Cited

U.S. PATENT DOCUMENTS

| | | | |
|---|---|---|---|
| 1,907,522 A | | 5/1933 | Eaton |
| 2,159,160 A | * | 5/1939 | Horsch .................. F16B 39/32 411/114 |
| 2,526,470 A | | 10/1950 | Gauthier |
| 2,648,997 A | | 8/1953 | Sawyer |
| 3,318,621 A | * | 5/1967 | Hawley .................. B22D 41/18 403/183 |
| 3,602,478 A | | 8/1971 | Cairns |
| 3,727,837 A | | 4/1973 | Gazzera et al. |
| 3,729,219 A | | 4/1973 | Crane |
| 3,913,883 A | | 10/1975 | Irwin |
| 3,985,151 A | | 10/1976 | Smith |
| 4,068,957 A | | 1/1978 | Brems et al. |
| 4,157,230 A | * | 6/1979 | Tomt ...................... E02D 5/523 403/296 |
| 4,274,754 A | | 6/1981 | Cohen |
| 4,500,224 A | | 2/1985 | Ewing |
| 5,346,172 A | | 9/1994 | Gonsior |
| 5,474,409 A | * | 12/1995 | Terry .................... F16B 31/028 411/134 |
| 5,575,582 A | * | 11/1996 | Frastaci ................. H05B 7/085 373/91 |
| 5,692,853 A | | 12/1997 | Litz et al. |
| 5,765,957 A | | 6/1998 | Connell |
| 6,015,134 A | | 1/2000 | Johnson |
| 6,250,605 B1 | | 6/2001 | Young |
| 6,679,663 B2 | | 1/2004 | DiStasio et al. |
| 6,886,805 B2 | | 5/2005 | McCarty |
| 6,905,297 B2 | | 6/2005 | DiStasio et al. |
| 7,179,011 B1 | | 2/2007 | Cohen |
| 7,189,044 B2 | | 3/2007 | Ball |
| 8,061,681 B2 | | 11/2011 | Dalluge |
| 9,062,794 B2 | | 6/2015 | Leger |
| 2005/0017209 A1 | | 1/2005 | Young |
| 2006/0093459 A1 | | 5/2006 | Ball |
| 2007/0267587 A1 | | 11/2007 | Dalluge |
| 2008/0099702 A1 | | 5/2008 | Dalluge et al. |
| 2009/0272927 A1 | | 11/2009 | Dalluge |
| 2011/0008098 A1 | | 1/2011 | Leger |

FOREIGN PATENT DOCUMENTS

| | | |
|---|---|---|
| JP | 6035912 | 3/1985 |
| JP | 633564 | 1/1988 |
| JP | 63195490 | 8/1988 |
| JP | 02082192 | 3/1990 |
| JP | 02217606 | 8/1990 |
| JP | 519716 | 3/1993 |
| JP | 07019230 | 1/1995 |
| JP | 2000161329 | 6/2000 |
| JP | 2003307288 | 10/2003 |
| JP | 2004204867 | 7/2004 |
| JP | 2006220210 | 8/2006 |
| JP | 2008184000 | 8/2008 |
| WO | 2008054943 | 5/2008 |

OTHER PUBLICATIONS

Japanese Patent Office, "Notice of Reasons for Rejection," issued in connection with Japanese Patent No. 2012519552, mailed on Mar. 18, 2014, 16 pages.
Mexican Institute of Industrial Property, "Office Action," issued in connection with Mexican Patent No. 2012000501, issued on Apr. 23, 2014, 3 pages.
Patent Cooperation Treaty, "International Search Report," issued in connection with PCT Application No. PCT/US2009/040303, mailed on Jul. 1, 2009, 4 pages.
Patent Cooperation Treaty, "Written Opinion," issued in connection with PCT Application No. PCT/US2009/040303, mailed on Jul. 1, 2009, 7 pages.
The State Intellectual Property Office of the People's Republic of China, "First Office Action," issued in connection with Chinese Application No. 201080030726, mailed on Mar. 4, 2013, 10 pages.
The State Intellectual Property Office of the People's Republic of China, "Third Office Action," issued in connection with Chinese Application No. 201080030726, mailed on Jan. 23, 2014, 18 pages.
The State Intellectual Property Office of the People's Republic of China, "Fourth Office Action," issued in connection with Chinese Application No. 201080030726, mailed on Apr. 23, 2014, 11 pages.
United States Patent and Trademark Office, "Advisory Action," issued in connection with U.S. Appl. No. 12/499,389, mailed on Apr. 11, 2013, 3 pages.
United States Patent and Trademark Office, "Final Office Action," issued in connection with U.S. Appl. No. 12/499,389, mailed on Jan. 24, 2013, 9 pages.
United States Patent and Trademark Office, "Notice of Allowance," issued in connection with U.S. Appl. No. 12/115,280, mailed on Jun. 30, 2011, 10 pages.
United States Patent and Trademark Office, "Notice of Allowance," issued in connection with U.S. Appl. No. 12/499,389, mailed on Feb. 20, 2015, 12 pages.
United States Patent and Trademark Office, "Non-Final Office Action," issued in connection with U.S. Appl. No. 12/115,280, mailed on Feb. 18, 2011, 15 pages.
United States Patent and Trademark Office, "Non-Final Office Action," issued in connection with U.S. Appl. No. 12/499,389, mailed on Jan. 6, 2012, 17 pages.
United States Patent and Trademark Office, "Non-Final Office Action," issued in connection with U.S. Appl. No. 12/499,389, mailed on Aug. 29, 2012, 8 pages.
United States Patent and Trademark Office, "Non-Final Office Action," issued in connection with U.S. Appl. No. 12/499,389, mailed on Apr. 7, 2014, 14 pages.

* cited by examiner

LOCKING ACTUATOR STEM AND ROD END BEARING APPARATUS FOR USE WITH FLUID VALVES

CROSS-REFERENCE TO RELATED APPLICATION

This patent arises from a continuation of U.S. application Ser. No. 12/499,389, entitled "Locking Actuator Stem And Rod End Bearing Apparatus For Use With Fluid Valves," filed on Jul. 8, 2009, which is incorporated herein by reference in its entirety.

FIELD OF THE DISCLOSURE

This disclosure relates generally to valve actuators and, more particularly, to locking actuator stem and rod end bearing apparatus for use with fluid valves.

BACKGROUND

Automated control valves such as, for example, rotary control valves, are often used in process control plants or systems to control the flow of process fluids. A rotary control valve typically includes an actuator (e.g., a pneumatic actuator, an electric actuator, a hydraulic actuator, etc.) operatively coupled to a shaft extending from the rotary valve via a lever. The lever converts a rectilinear displacement of an actuator stem into a rotational displacement of the valve shaft. Thus, rotation of the lever causes the valve shaft and a flow control member (e.g., a disk, a ball, etc.) coupled to the valve shaft to rotate to increase or restrict fluid flow through the valve.

To couple the lever to the actuator stem, a rod end bearing is typically employed. The rod end bearing may include an internally threaded bore (i.e., a female connection) that threadably receives an externally threaded end (i.e., a male connection) of the actuator stem. Alternatively, the rod end bearing may include an externally threaded end that threadably couples to an internally threaded bore of the actuator stem.

In some cases, a chemical thread locking gel may be employed to lock the threads of the actuator stem and rod end bearing connection. However, such locking gels may not provide sufficient locking strength and may allow the rod end bearing and the actuator stem to decouple even when a small amount of torque is applied during disassembly of the actuator (e.g., removal of a diaphragm cap screw).

SUMMARY

In one example, an example apparatus for use with a control valve actuator includes a rod end bearing having a bearing retainer and a shaft portion extending from the bearing retainer, where the shaft portion defines a first face. An actuator stem has a first end to be operatively coupled to a diaphragm plate of the control valve actuator and a second end to be coupled to the rod end bearing, where the second end defines a second face. The first face engages the second face to provide a lock that prevents rotation of the actuator stem relative to the rod end bearing when the actuator stem is rotated in a first direction.

In another example, an example apparatus for use with control valve actuators includes a rod end bearing having a first end and an actuator stem having a second end. The first end of the rod end bearing engages the second end of the actuator stem to provide an anti-rotation lock that prevents the actuator stem and the rod end bearing from decoupling when the actuator stem is coupled to a diaphragm plate.

In yet another example, an example apparatus for use with a valve actuator includes means for coupling a rod end bearing and an actuator stem to provide a rod end bearing and actuator stem connection for use with rotary valves actuators. The example apparatus includes first means for locking integrally formed with at least a portion of a first end of the rod end bearing, and second means for locking integrally formed with at least a portion of a second end of the actuator stem. The first and second means for locking engage when the rod end bearing and the actuator stem are coupled together via the means for coupling. The first and second means for locking engage to prevent the actuator stem from decoupling from the rod end bearing when the actuator stem is rotated in a first direction relative to the rod end bearing.

DETAILED DESCRIPTION

In general, the example apparatus described herein prevent inadvertent decoupling of a connection between a rod end bearing and an actuator rod or stem of a control valve actuator. In particular, the example apparatus include a rod end bearing and an actuator stem having an (e.g., integrally formed) anti-rotation or locking mechanism to prevent disassembly of the rod end bearing and the actuator stem during, for example, maintenance or repair of an actuator. For example, a rod end bearing and actuator stem connection described herein can prevent decoupling of the connection even if a relatively large amount of torque applied to a fastener when coupling and/or removing a diaphragm plate to and/or from the end of the actuator stem opposite the end coupled to the rod end bearing. In contrast to many known devices, the anti-rotation or locking mechanisms described herein do not require chemicals (e.g., thread locking compounds), additional parts, or components.

Figure 1:
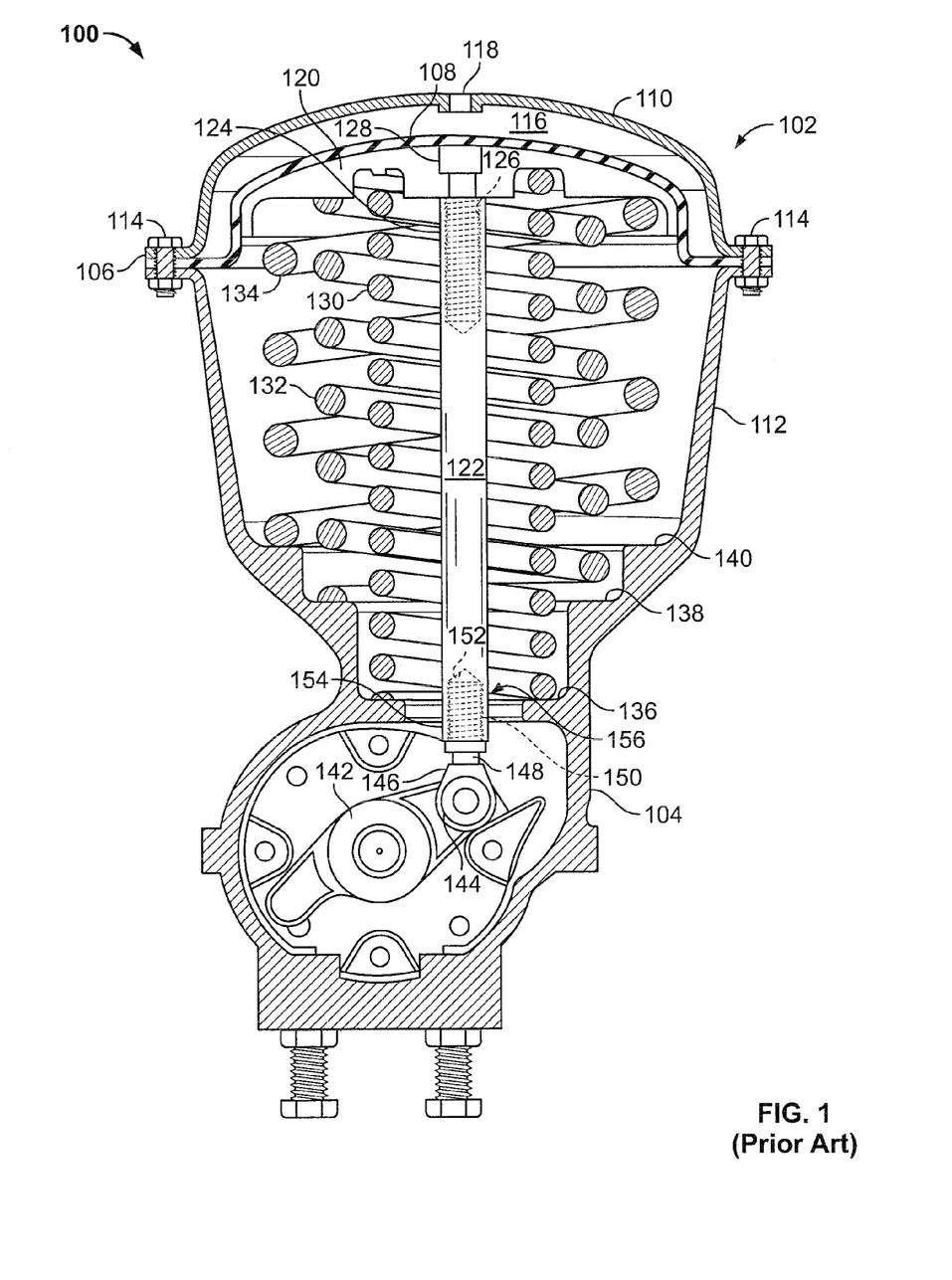
FIG. 1 illustrates a known example rotary valve actuator having an externally threaded rod end bearing coupled to an internally threaded bore of an actuator stem.

FIG. 1 is a cross-sectional view of a known control valve actuator or actuator assembly 100 that may be used with, for example, a rotary fluid valve. Referring in detail to FIG. 1, the example actuator assembly 100 includes an actuator 102 coupled to a housing 104. The actuator 102 includes a casing 106 that captures a diaphragm 108 between an upper casing portion 110 and a lower casing portion 112. The casing portions 110 and 112 are coupled together with a plurality of threaded fasteners 114 spaced along an outer edge of the casing 106. The diaphragm 108 separates the space within the casing 106 into a control pressure chamber 116 through which a controlled pressure is supplied via an inlet port 118 to displace the diaphragm 108. A diaphragm plate 120 couples the diaphragm 108 to an actuator stem or diaphragm rod 122 and provides a rigid backing for the diaphragm 108. The actuator stem 122 includes a first end 124 having an internally threaded bore 126 that receives a fastener 128 (e.g., a cap screw) to couple the diaphragm plate 120 to the actuator stem 122.

Springs 130, 132, and 134 surround the actuator stem 122 and are disposed between the diaphragm plate 120 and respective spring seats 136, 138, and 140 integrally formed as shoulders on the lower casing 112. Each of the springs 130, 132, and 134 provides a biasing force against the diaphragm plate 120 to return the actuator stem 122 and any suitable operator (e.g., a flow control member of a rotary valve) coupled to the actuator stem 122 to a known position in the absence of a control pressure applied to the diaphragm 108. The actuator stem 122 rotatably couples to a lever 142 via a rod end bearing 144.

The rod end bearing 144 includes a bearing retainer or body 146 having a stem, shaft or shank 148 extending therefrom. The retainer body 146 rotatably couples to the lever 142 and the shaft 148 couples to the actuator stem 122. At least a portion of the shaft 148 includes external threads 150 that threadably couple to an internally threaded bore 152 at a second end 154 of the actuator stem 122. However, in other examples, the shaft 148 of the rod end bearing 144 may include an internally threaded bore that receives an externally threaded portion of the actuator stem 122.

During assembly of the actuator assembly 100, the rod end bearing 144 is coupled to the actuator stem 122 and disposed within the housing 104. The springs 130, 132, and 134 are then disposed in the actuator casing 106 to surround the actuator stem 122. The diaphragm plate 120 is then coupled to the actuator stem 122 via the fastener 128. As the fastener 128 is tightened, the diaphragm plate 120 compresses the springs 130, 132, and 134, which provides a preload condition. The torque applied to tighten the fastener 128 causes the actuator stem 122 to angularly deflect, thereby transmitting a torsional load to the rod end bearing and actuator stem connection 156.

In some instances, during disassembly of the actuator assembly 100 for maintenance, replacement of components, and/or any other purpose, when the fastener 128 is loosened, the actuator stem 122 may rotate relative to the rod end bearing 144 and may cause the actuator stem 122 to loosen relative to and/or decouple from the rod end bearing 144. As a result, the springs 130, 132 and 134 may exit from the casing 106.

To prevent the actuator stem 122 and/or the rod end bearing 144 from loosening or decoupling when the cap screw 128 is loosened, a chemical thread locking gel (not shown) is often used to lock the threads of the actuator stem 122 and rod end bearing 144. However, such chemical locking gels increase manufacturing costs and may not provide adequate strength to prevent the actuator stem 122 and rod end bearing 144 from decoupling (i.e., unthreading) during, for example, disassembly of the diaphragm plate 120 and the actuator stem 122. For example, even with the use of such a chemical locking gel, disassembly or decoupling of the actuator stem and rod end bearing connection 156 may occur when a relatively low torque is applied to the cap screw 128. Although the actuator assembly 100 of FIG. 1 illustrates a pneumatic actuator 102, the example actuator assembly 100 may be implemented with other types of actuators such as, for example, an electric actuator, a hydraulic actuator, etc.

Figure 2:
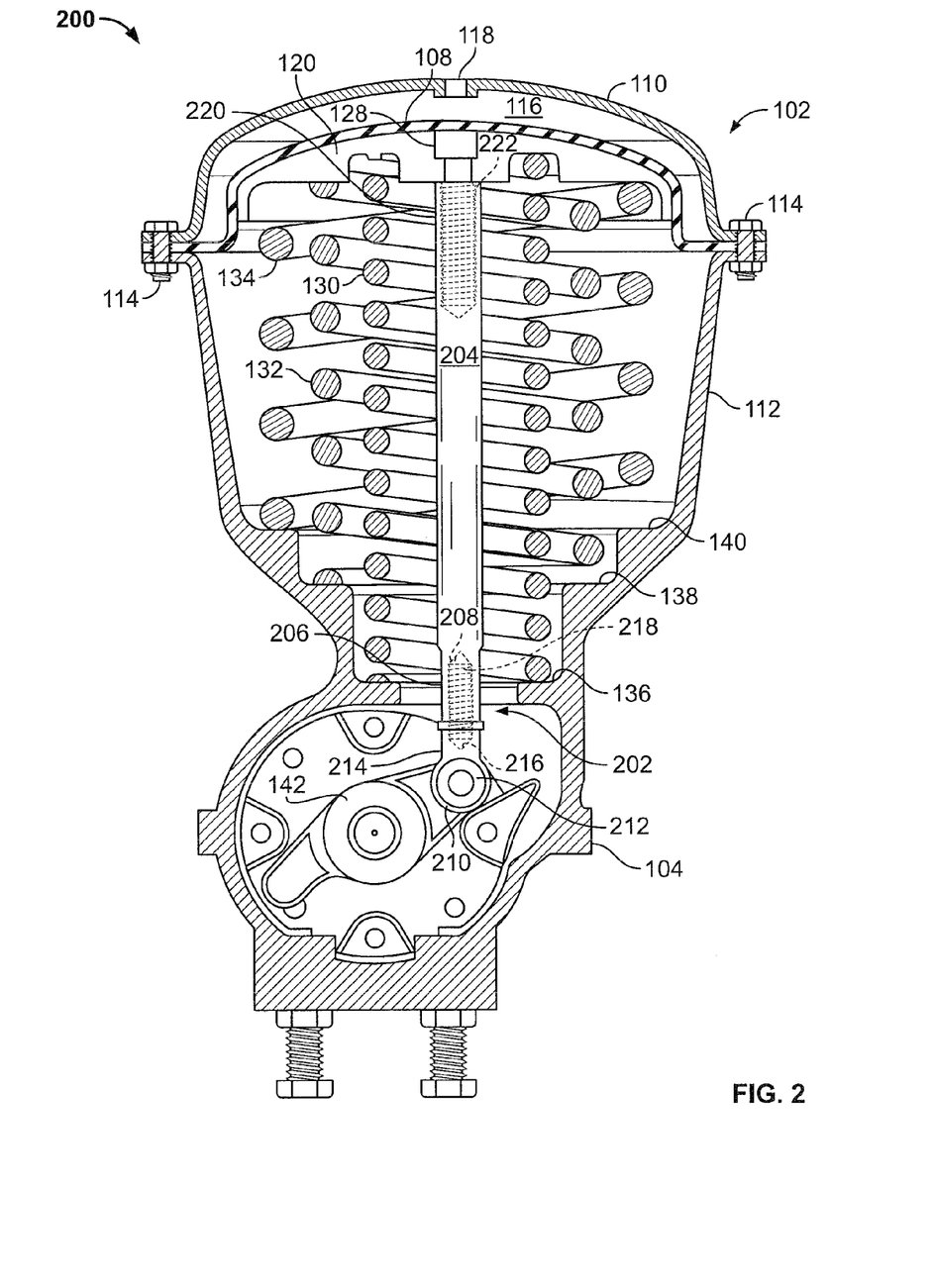
FIG. 2 illustrates an example rotary valve actuator implemented with an example rod end bearing and actuator stem connection described herein.

FIG. 2 illustrates an example control valve actuator or actuator assembly 200 implemented with an example rod end bearing and actuator stem connection 202 described herein. Those components of the example actuator assembly 200 of FIG. 2 that are substantially similar or identical to those components of the example actuator assembly 100 described above and that have functions substantially similar or identical to the functions of those components will not be described in detail again below. Instead, the interested reader is referred to the above corresponding descriptions in connection with FIG. 1. Those components that are substantially similar or identical will be referenced with the same reference numbers as those components described in connection with FIG. 1.

In the illustrated example of FIG. 2, an actuator stem 204 includes a first end 206 having an internally threaded bore 208 that may be any suitable length (e.g., to prevent the threads from stripping due to tightening). A rod end bearing or spherically shaped bearing 210 includes a bearing retainer or body 212 having a stem, shaft or shank 214 extending therefrom. The shaft 214 includes an internally threaded bore 216 that may be any suitable length. An externally threaded stud 218 threadably engages the bores 208 and 216 to couple the actuator stem 204 and the rod end bearing 210. The actuator stem 204 also includes a second end 220 having an internally threaded bore 222 that receives the fastener 128 to couple the actuator stem 204 to the diaphragm plate 120 and the diaphragm 108. As the diaphragm plate 120 is fastened to the actuator stem 204, the springs 130, 132, and 134 compress to provide a preload. Additionally, during assembly of the actuator assembly 200, the torque applied to the fastener 128 to couple the diaphragm plate 120 to the actuator stem 204 transmits a torsional load to the actuator stem 204, causing the actuator stem 204 to angularly deflect and/or rotate. When assembled, the actuator stem 204 and the rod-end bearing 210 retain the springs 130, 132, and 134 under compression within the housing 112 of the actuator assembly 200.

As described in greater detail below in connection with FIGS. 3A and 3B, the connection 202 provides an anti-rotation or locking mechanism configured to prevent rotation of the actuator stem 204 relative to the rod end bearing 210 once the actuator stem 204 is coupled to the rod end bearing 210. For example, when disassembling the actuator assembly 200 during, for example, maintenance, the cap screw 128 is loosened. The connection 202 prevents the actuator stem and the rod end bearing connection 202 from becoming loose, even when a relatively high torque is applied to the fastener 128 as the fastener 128 is loosened (e.g., turned in a counterclockwise direction). Thus, the connection 202 prevents the actuator stem 204 and the rod end bearing 210 from decoupling, unthreading or separating when the fastener 128 is removed from the diaphragm plate 120 and the actuator stem 204. The connection 202 is configured to enable assembly of the actuator stem 204 and the rod end bearing 210 using a relatively low torque, while preventing disassembly or requiring a relatively high torque to disassemble or decouple the actuator stem 204 from the rod end bearing 210.

Figures 3A, 3B:
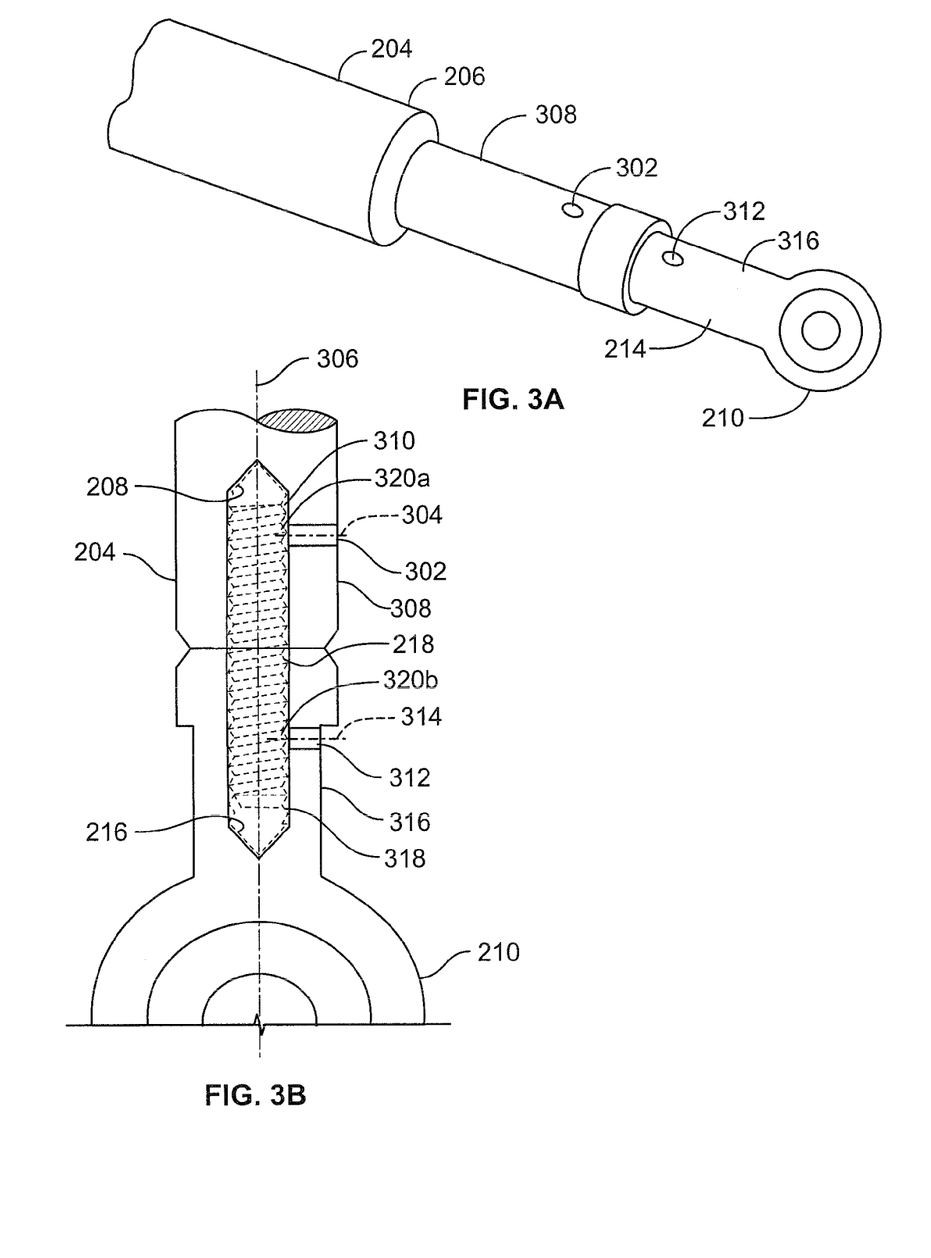
FIG. 3A illustrates an enlarged partial view of the example rod end bearing and actuator stem connection of FIG. 2.
FIG. 3B illustrates a cross-sectional view of the example rod end bearing and actuator stem connection illustrated in FIG. 3A.

FIG. 3A illustrates the example actuator stem 204 and rod end bearing 210 of FIG. 2. FIG. 3B illustrates a partial cross-sectional enlarged view of the example actuator stem 204 and the rod end bearing 210 of FIG. 3A.

Referring to FIGS. 3A and 3B, the rod end bearing 210 is coupled to the first end 206 of the actuator stem 204 via the externally threaded stud 218. In this example, the actuator stem 204 and the shaft 214 of the rod end bearing 210 have cylindrically-shaped bodies. The actuator stem 204 includes an opening 302 having an axis 304 that is substantially perpendicular to an axis 306 of the actuator stem 204. The opening 302 extends from an outer surface 308 of the actuator stem 204 to an inner surface 310 of the bore 208. As shown in this example, the rod end bearing 210 also includes an opening 312 having an axis 314 substantially perpendicular to the axis 306. The opening 312 extends from an outer surface 316 of the rod end bearing 210 to an inner surface 318 of the bore 216. In other examples, the actuator stem 204 and/or the rod end bearing 210 may include a plurality of openings along the respective ends 206 and 214 of the actuator stem 204 and/or the rod end bearing 210. In yet other examples, the openings 302 and/or 312 may be a slot, an elongated slot, an angled opening, an angled slot or any other opening.

A relatively low torque is required to couple the actuator stem 204 to the rod end bearing 210 when the actuator stem 204 and the rod end bearing 210 are assembled via the threaded stud 218. In the illustrated example, once assembled, at least a portion of the threads 320a of the stud 218 are exposed via the opening 302 and another portion of the threads 320b of the stud 218 are exposed via the opening 312. In this manner, the exposed threads 320a and/or 320b of the stud 218 may be deformed (e.g., plastically deformed) via, for example, a punch or any other suitable tool (e.g., inserted via the respective openings 302 and 312). Such deformation of the threads 320a and/or 320b provides an anti-rotation or locking mechanism to prevent inadvertent disassembly of the actuator stem 204 and the rod end bearing 210. In other words, a substantial amount of torque would be required to turn the actuator stem 204 relative to the rod end bearing 210 to decouple or disengage the actuator stem 204 and the rod end bearing 210 when the exposed threads 320a and/or 320b are deformed.

Thus, the locking mechanism of FIGS. 2, 3A and 3B provides a locked condition between rod end bearing 210 and the actuator stem 204 to further resist torsional load and angular deflection that may be experienced by the actuator stem 204 when the fastener 128 is loosened or turned (e.g., in a counter-clockwise direction) about the axis 306.

Figure 4A:
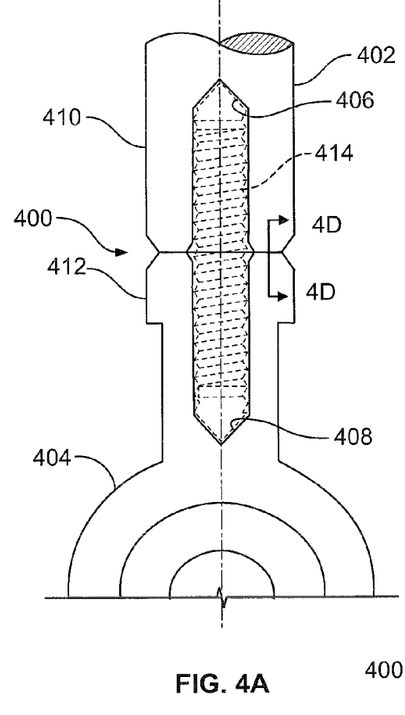
FIGS. 4A-4D illustrate yet another example rod end bearing and actuator stem connection described herein.
Figure 4B:
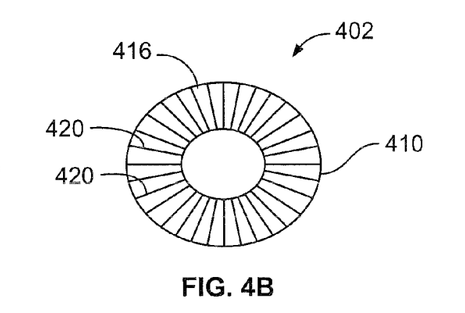
Figure 4C:
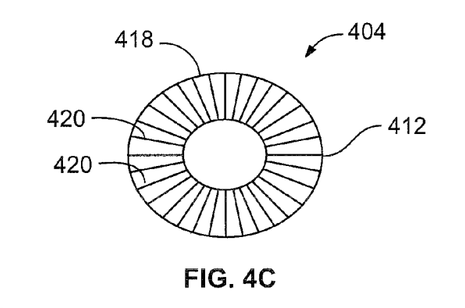
Figure 4D:
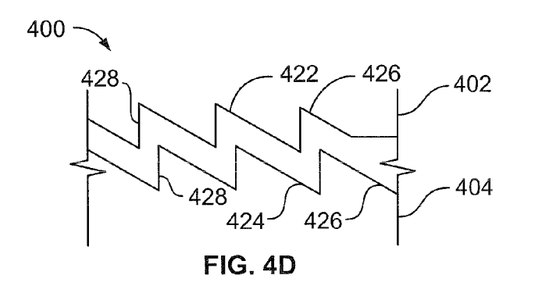

FIG. 4A illustrates yet another example actuator stem and rod end bearing connection 400 described herein that may be used to implement, for example, the actuator assembly 100 of FIG. 1. FIGS. 4B and 4C illustrate end views of an example actuator stem 402 and a rod end bearing 404 of FIG. 4A. FIG. 4D illustrates a cross-sectional side view of the example actuator stem and the rod end bearing connection 400 taken along line 4D-4D of FIG. 4A.

Referring to FIGS. 4A-4D, the actuator stem 402 and the rod end bearing 404 include respective threaded bores 406 and 408 at respective first ends 410 and 412 of the actuator stem 402 and the rod end bearing 404. The bores 406 and 408 are sized to receive an externally threaded stud 414 to couple the actuator stem 402 and the rod end bearing 404.

Referring to FIGS. 4B and 4C, in this example, the first end 410 of the actuator stem 402 includes a face or surface 416 (FIG. 4B) having a shape or geometry to matably engage or interlock with a complementary shape or geometry of a face or surface 418 (FIG. 4C) of the rod end bearing 404. The faces 416 and 418 of the respective actuator stem 402 and rod end bearing 404 interlock to provide an anti-rotation or locking mechanism when the actuator stem 402 is coupled to the rod end bearing 404. More specifically, in this example, and as most clearly shown in FIGS. 4B and 4C, the face 416 of the actuator stem 402 and the face 418 of the rod end bearing 404 have a plurality of serrations 420 such as, for example, sawtooth-shaped portions 422 and 424. For example, the sawtooth-shaped portions 422 of the actuator stem 402 are adapted to matably engage the corresponding or complementary sawtooth-shaped portions 424 of the rod end bearing 404.

Referring to FIG. 4D, coupling the actuator stem 402 and the rod end bearing 404 causes the teeth or sawtooth-shaped portions 422 to engage with the teeth or the sawtooth-shaped portions 424 to provide an anti-rotation or locking mechanism. In particular, referring to FIG. 4D, each of the sawtooth-shaped portions 422 and 424 includes a sloped surface or edge 426 and a locking surface 428. The sloped edges 426 of the sawtooth-shaped portions 422 and 424 enable the actuator stem 402 to rotate in a first direction (e.g., a clockwise direction) relative to the rod end bearing 404 about an axis 430. However, the locking surface 428 of each of the sawtooth-shaped portions 422 and 424 engage to prevent rotation of the actuator stem 402 in a second direction (e.g., a counterclockwise direction) relative to the rod end bearing 404 about the axis 430.

When the example actuator stem 402 and rod end bearing 404 are coupled to, for example, the actuator assembly 100 of FIG. 1, the sloped edges 426 enable the actuator stem 402 to rotate (e.g., in a clockwise direction) relative to the rod end bearing 404 when the fastener 128 is rotated (e.g., a torque is applied to the fastener 128 in a clockwise direction) about the axis 430 during assembly of the diaphragm plate 120 and the actuator stem 402. However, during disassembly, the locking surfaces 428 engage to prevent rotation of the actuator stem 402 relative to the rod end bearing 404 when the fastener 128 is rotated (e.g., when a torque is applied to the fastener 128 in a counterclockwise direction) about the axis 430 to disassemble the diaphragm plate 120 from the actuator stem 402. Alternatively, in other examples, only a portion of the face 416 and/or the face 418 may include serrations 420, sawtooth-shaped portions 422 and 424 and/or any other suitably shaped portions.

Figure 5:
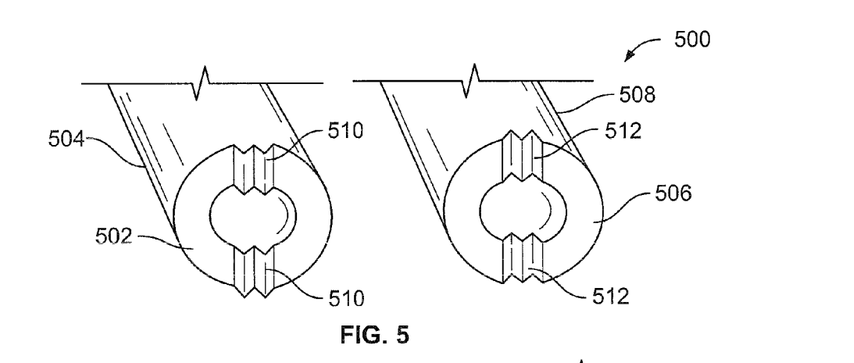
FIG. 5 illustrates yet another example rod end bearing and actuator stem connection described herein.

The example anti-rotation or locking mechanisms are not limited to the serrations 420 or sawtooth-shaped portions 422 and 424 illustrated in FIGS. 4A-4D. FIG. 5 illustrates another example actuator stem and rod end bearing connection 500 described herein that provides an anti-rotation or locking mechanism. In the illustrated example, only a portion of a face 502 of an actuator stem 504 and a portion of a face 506 of a rod end bearing 508 include serrations or other suitable complementary-shaped portions. In the illustrated example, the face 502 of the actuator stem 504 includes protruding members 510 and the face 506 of the rod end bearing 508 includes complementary recessed or grooved portions 512. The recessed portions 512 are sized and/or shaped to receive or matably engage with the protruding members 510 when the actuator stem 504 and the rod end bearing 508 are coupled together. When assembled, the protruding members 510 engage the recessed portion 512 to prevent rotation of the actuator stem 504 relative to the rod end bearing 508 when, for example, the actuator stem 504 and the rod end bearing 508 are coupled to the example actuator assembly 100 of FIG. 1 and the fastener is rotated (e.g., in a counterclockwise direction) relative to the actuator stem 504.

Figure 6A:
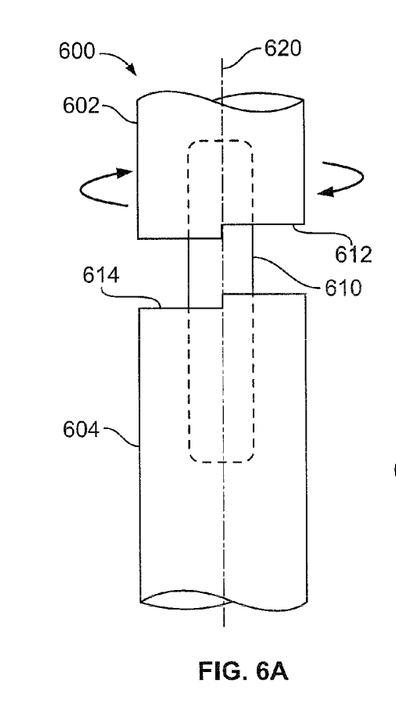
FIGS. 6A-6C illustrate yet another example rod end bearing and actuator stem connection described herein.
Figure 6B:
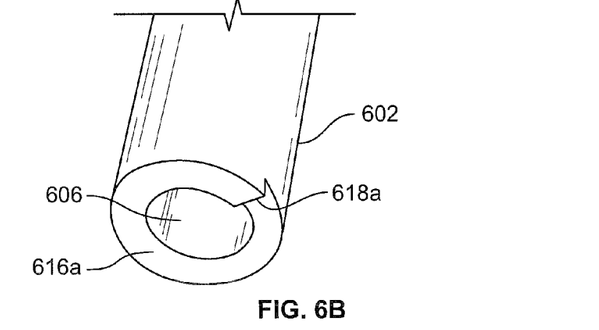
Figure 6C:
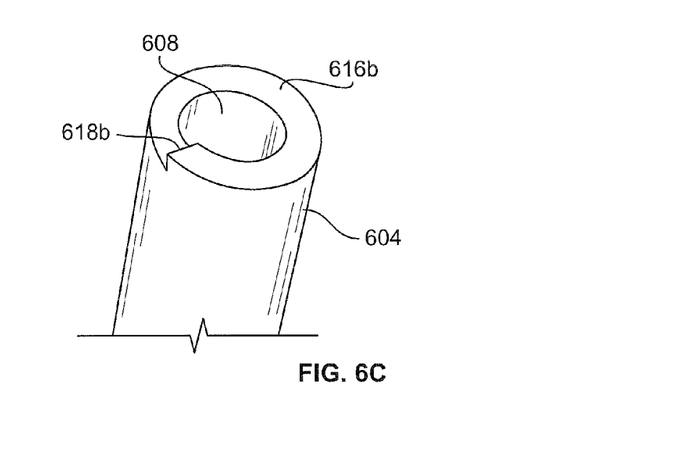

FIGS. 6A-6C illustrate yet another example actuator stem and rod end bearing connection 600 described herein providing an anti-rotation or locking mechanism. In this example, an actuator stem 602 and a rod end bearing 604 include respective apertures 606 and 608 to receive a pin or stud 610 (e.g., a non-threaded stud, an externally threaded stud, etc.). A first face or end 612 of the actuator stem 602 and a first face or end 614 of the rod end bearing 604 include helically-shaped ends. The ends 612 and 614 include respective sloped or curved surfaces 616a and 616b forming respective wedges, shoulders or locking surfaces 618a and 618b. When coupled together, the sloped surfaces 616a and 616b enable rotation of the actuator stem 602 relative to the rod end bearing 604 in a first direction about an axis 620. However, the shoulders or locking surfaces 618a and 618b prevent rotation of the actuator stem 602 relative to the rod end bearing 604 in a second direction opposite the first direction about the axis 620.

When the example actuator stem 602 and rod end bearing 604 are coupled to, for example, the actuator assembly 100 of FIG. 1, the ends 612 and 614 matably engage to provide an anti-rotation or locking mechanism. During assembly of the diaphragm plate 120 and the actuator stem 602, the sloped surfaces 616 enable the actuator stem 602 to rotate (e.g., in a clockwise direction) relative to the rod end bearing 604 about the axis 620 when the fastener 128 is tightened or rotated (e.g., when a torque is applied to the fastener 128 in a clockwise direction). However, during disassembly of the diaphragm plate 120 and the actuator stem 602, the shoulders or locking surfaces 618a and 618b engage to prevent rotation of the actuator stem 602 relative to the rod end bearing 604 about the axis 620 when the fastener 128 is loosened or rotated (e.g., when a torque is applied to the fastener 128 in a counterclockwise direction) about the axis 620.

Figures 7A, 7B, 7C, 7D:
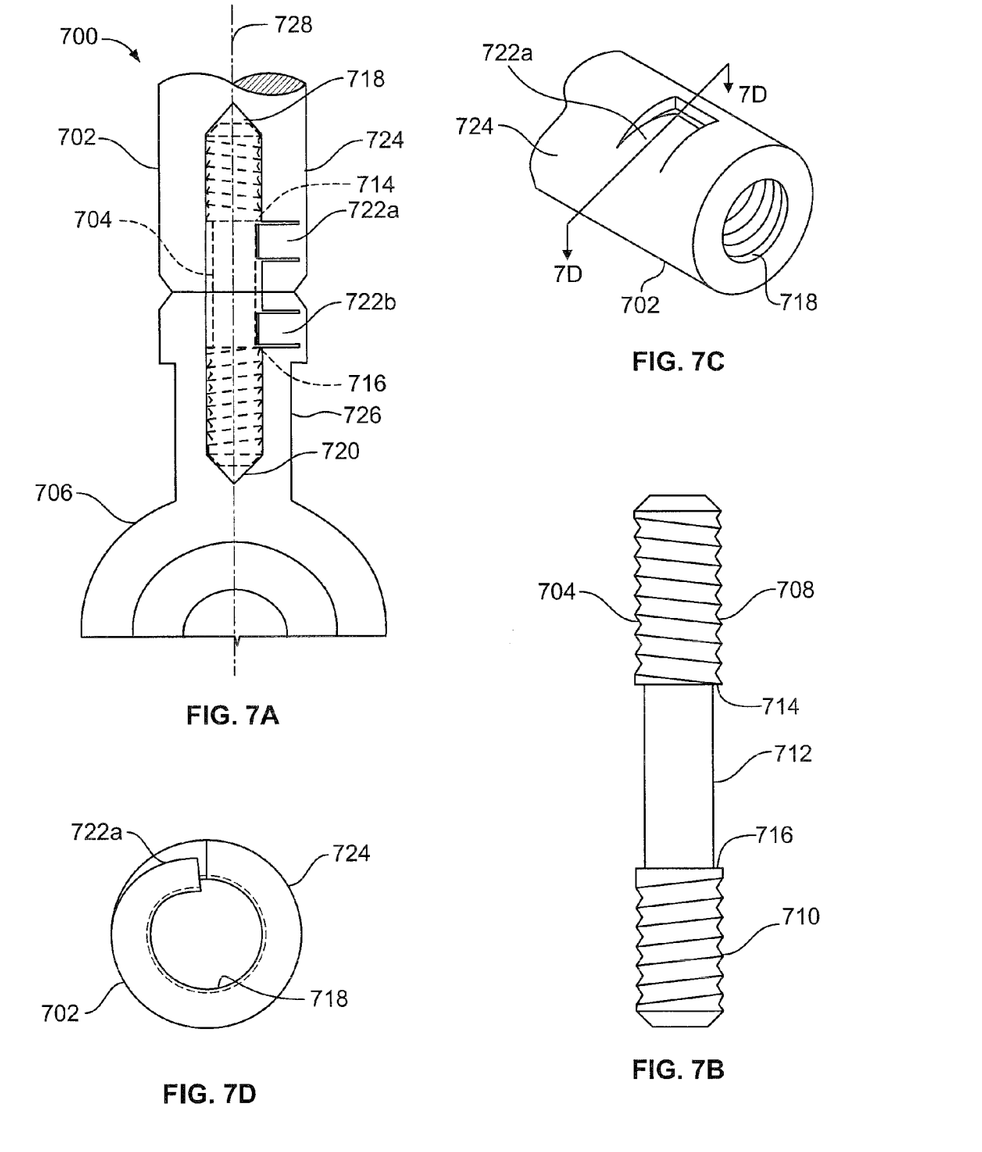
FIGS. 7A-7D illustrate yet another example rod end bearing and actuator stem connection described herein.

FIG. 7A is a partial cross sectional view of yet another example actuator stem and rod end bearing connection 700 providing an anti-rotation or locking mechanism. FIG. 7B illustrates an example stud or pin 704. FIG. 7C illustrates a partial view of an example actuator stem 702 of FIG. 7A. FIG. 7D is a cross-sectional view of the actuator stem 702 of FIG. 7C taken along line 7D-7D.

Referring to FIGS. 7A and 7B, the actuator stem 702 is coupled to a rod end bearing 706 via the stud 704. In the illustrated example, the stud 704 includes first and second threaded ends or portions 708 and 710 and a recessed portion or reduced shank 712 between the threaded portions 708 and 710. The diameter of each of the threaded portions 708 and 710 is larger than the diameter of the recessed portion 712. In this manner, the recessed portion 712 forms a first shoulder 714 adjacent the first threaded portion 708 and a second shoulder 716 adjacent the second threaded portion 710. The actuator stem 702 and the rod end bearing 706 include threaded bores 718 and 720 to receive the respective first and second threaded portions 708 and 710 of the stud 704. In other examples, the first and second ends 708 and 710 are non-threaded and are received by respective non-threaded bores of the actuator stem 702 and the rod end bearing 706.

Referring also to FIGS. 7C and 7D, in the illustrated example, the actuator stem 702 and the rod end bearing 706 include respective tabs or deflectable members 722a and 722b. The tab 722a is disposed along (e.g., integrally formed with) a body 724 of the actuator stem 704 and the tab 722b is disposed along (e.g., integrally formed with) a body 726 of the rod end bearing 706. The tabs 722a and 722b may be formed via a punching operation or any other suitable manufacturing process. When the actuator stem 702 is coupled to the rod end bearing 706, the tabs 722a and 722b are pressed or deformed (e.g., plastically deformed) toward the stud 704 via, for example, a tool.

When the tabs 722a and 722b are deformed toward the stud 704, the tabs 722a and 722b engage the respective first and second shoulders 714 and 716 of the stud 704 to provide a locking mechanism or locked condition. In this manner, the tabs 722a and/or 722b prevent the actuator stem 702 from disengaging or decoupling from to the rod end bearing once the tabs 722a or 722b are deformed to engage the shoulders 714 and 716 of the stud 704. For example, FIG. 7C illustrates a perspective view of a portion of the actuator stem 702 showing the tab 722a in a depressed or deformed condition. FIG. 7D illustrates a cross-sectional view taken along line 7D-7D of FIG. 7C showing the tab 722a in a depressed or deformed condition relative to the body 724 of the actuator stem 702.

In operation, when coupled to, for example, the example actuator assembly 100 of FIG. 1, the tabs 722a and/or 722b provide a locking mechanism to prevent the actuator stem 702 from disengaging or decoupling from or rotating relative to the rod end bearing 706 when a torque is applied to the fastener 128 (e.g., in a counterclockwise direction) about an axis 728. In other examples, either or both of the actuator stem 702 or the rod end bearing 706 may include tabs or deformable members such as the tabs 722a or 722b. In yet other examples, the actuator stem 702 and/or the rod end bearing 706 may include a plurality of such tabs or deformable members.

Figure 8:
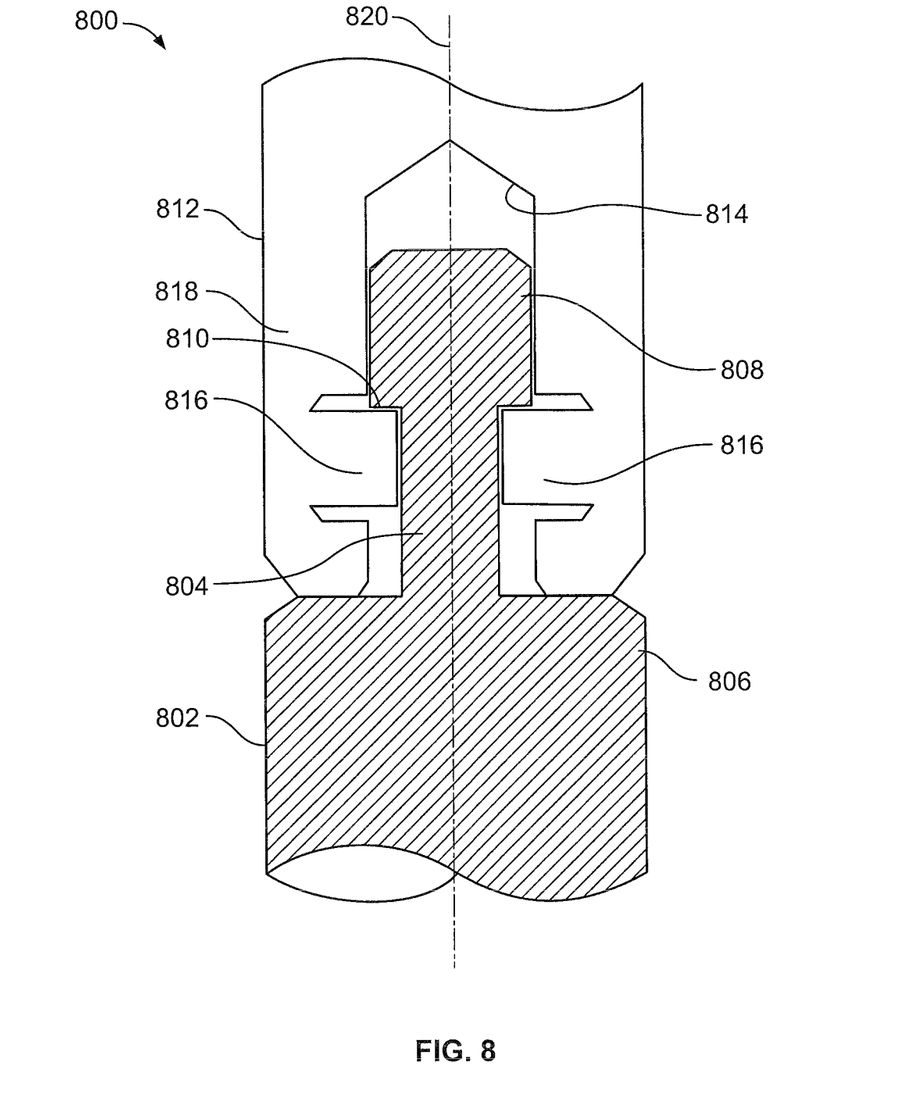
FIG. 8 illustrates yet another example rod end bearing and actuator stem connection described herein.

FIG. 8 illustrates yet another example actuator stem and rod end bearing connection 800 providing a locking mechanism. In this example, a rod end bearing 802 includes a stem or shaft 804 protruding from a body or bearing 806 of the rod end bearing 802. The shaft 804 includes a head portion 808 having a first diameter that is larger than a diameter of the shaft 804 to form or provide a shoulder 810 adjacent the head portion 808. An actuator stem 812 includes a bore 814 that is sized to receive the head portion 808 of the shaft 804. In this example, the actuator stem 812 also includes tabs 816 that are integrally formed with a body 818 of the actuator stem 812 via, for example, machining.

When assembled, the bore 814 of the actuator stem 812 receives the head portion 808 of the shaft 804 of the rod end bearing 810. The head portion 808 is disposed within the bore 814 until the head portion 808 moves adjacent (e.g., moves past) the tabs 816 of the actuator stem 812. The tabs 816 are then deformed (e.g., plastically deformed) via, for example, a tool to engage the shoulder 810 formed by the head portion 808 and the shaft 804. In this manner, the tabs 816 provide a locking mechanism to lock the actuator stem 812 and the rod end bearing 802 together and prevent disassembly of the actuator stem 812 and the rod end bearing 802.

When coupled to, for example, the actuator assembly 100 of FIG. 1, the tabs 816 prevent the actuator stem 812 and the rod end bearing 802 from disengaging or decoupling when a torque is applied to the fastener 128 (e.g., in a counterclockwise direction) about an axis 820 during disassembly of the diaphragm plate 120 and the actuator stem 812. In other words, even if the actuator stem 812 rotates relative to the rod end bearing 802, the tabs 816 engage the shoulder 810 to provide a locking mechanism that prevents the actuator stem 812 from disengaging or decoupling from the rod end bearing 802.

Figure 9A:
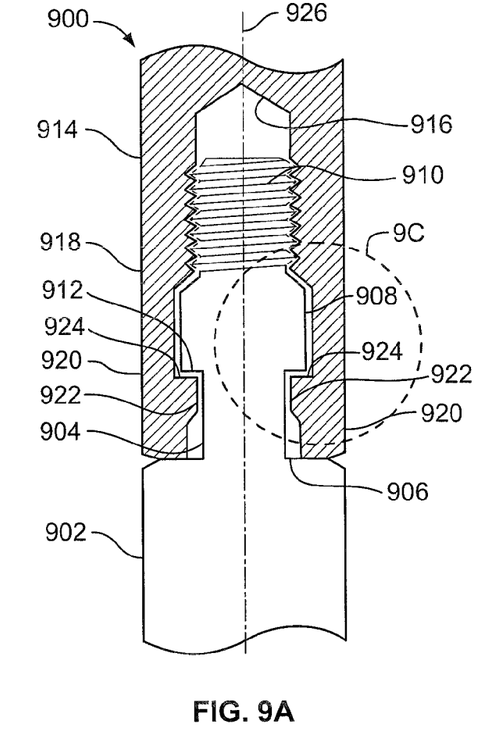
FIGS. 9A-9C illustrate yet another example rod end bearing and actuator stem connection described herein.
Figure 9B:
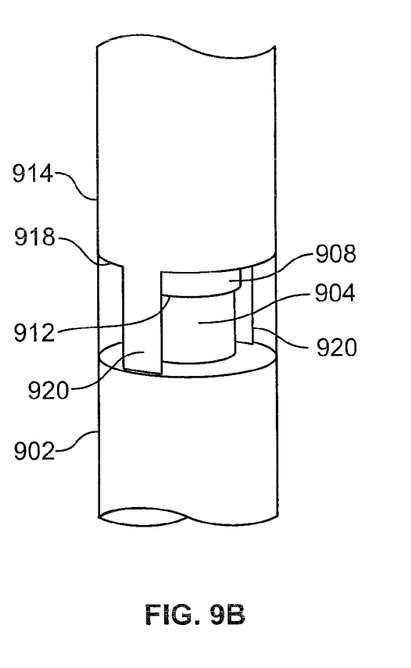
Figure 9C:
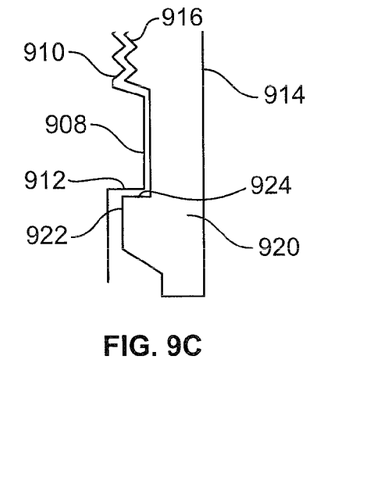

FIGS. 9A-9C illustrate yet another example actuator stem and rod end bearing connection 900 having a locking mechanism. In this example, a rod end bearing 902 includes a stem or shaft 904 protruding from an end 906 of the rod end bearing 902. The shaft includes a head portion 908 and a threaded portion 910. The head portion 908 is sized larger than the shaft 904 (e.g., the head portion 908 has a diameter greater than a diameter of the shaft 904) to form a shoulder 912. The shaft 904 may be formed via for example, machining and/or any other suitable manufacturing process(es).

An actuator stem 914 has an internally threaded bore 916 that is sized to receive the threaded portion 910 of the rod end bearing 902. Additionally, an end 918 of the actuator stem 914 includes fingers or deflectable members 920 protruding from the actuator stem 914 that can deflect (e.g., elastically deform) relative to the actuator stem 914. Each of the fingers 920 includes a lip or protruding tab 922. The actuator stem 914 may be formed via, for example, machining and/or any other suitable manufacturing process(es).

During assembly, the threaded portion 910 of the shaft 904 of the rod end bearing 902 threadably engages the threaded bore 916 of the actuator stem 914. As the shaft 904 threads into the threaded bore 916, the head portion 908 engages the tabs 922 of the fingers 920 causing the fingers 920 to deflect (e.g., elastically deflect) outward or away from the actuator stem 914. The head portion 908 may include a tapered surface 924 to facilitate engagement and/or deflection of the fingers 920 via the tabs 922. The shaft 904 is threaded with the threaded bore 916 until the head portion 908 releases, clears or moves past the tabs 922. Once the head portion 908 is adjacent the tabs 922, the fingers 920 spring back toward the shaft 904 or the actuator stem 914 so that the surfaces 924 (e.g., top surfaces) of the tabs 922 engage the shoulder 912 of the shaft 904 to provide a locked condition between the actuator stem 914 and rod end bearing 902. In this manner, the tabs 922 engage the shoulder 912 to provide a locking mechanism or locked condition to prevent the actuator stem 914 from decoupling or disengaging from the rod end bearing 902. As a result, the actuator stem 914 cannot be disassembled from the rod end bearing 902 without manipulation (e.g., from a maintenance person) of the flexible fingers 920.

Thus, when coupled to, for example, the actuator assembly 100 of FIG. 1, the tabs 922 of the fingers 920 engage the shoulder 912 to provide a locking mechanism that prevents the actuator stem 914 from disengaging or decoupling from the rod end bearing 902 when a torque is applied to the fastener 128 (e.g., in a counter-clockwise direction) about an axis 926 when disassembling the diaphragm plate 120 from the actuator stem 912.

The example actuator stems 204, 402, 504, 602, 702, 812, 914 and rod end bearings 210, 404, 508, 604, 706, 802, 902 described herein may be factory installed and/or may be retrofit to existing valves. For example, to retrofit an existing valve such as, for example, the actuator assembly 100 of FIG. 1, the rod end bearing 144 and the actuator stem 122 are removed and replaced with the respective example actuator stems 204, 402, 504, 602, 702, 812, or 914 and rod end bearings 210, 404, 508, 604, 706, 802, or 902. In the examples shown in FIGS. 2, 3A, 3B, 4A-4D, 5, 6A-6C, and 7A-7D, the studs 218, 414, 610, and 704 may be obtained or provided to couple the respective actuator stems 204, 402, 504, 602, 702, 812, or 914 and rod end bearing 210, 404, 508, 604, 706, 802, or 902. The studs 218, 414, 610, and/or 704 may be made of high strength, alloy steel and may be made via machining or any other suitable process(es).

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. An apparatus for use with a control valve actuator, the apparatus comprising:
    a rod end bearing having a bearing retainer and a shaft portion extending from the bearing retainer, the shaft portion defining a first face and a first bore; and
    an actuator stem having a first end to be operatively coupled to a diaphragm plate of the control valve actuator and a second end to be coupled to the rod end bearing, the second end defining a second face and a second bore, the first face and the second face include complementary-shaped portions that interlock when the first face is in engagement with the second face to provide a lock that prevents rotation of the actuator stem relative to the rod end bearing when the actuator stem is rotated in a first direction, the first bore to be coaxially aligned with the second bore when the first face is in engagement with the second face.

2. An apparatus as defined in claim 1, wherein the first face is adjacent a first opening of the first bore and the second face is adjacent a second opening of the second bore.

3. An apparatus as defined in claim 1, wherein the complementary-shaped portions include a plurality of serrations.

4. An apparatus as defined in claim 3, wherein the plurality of serrations includes a sloped surface and a locking surface.

5. An apparatus as defined in claim 4, wherein the sloped surface of the serrations of the first face matably engage with the sloped surface of the serrations of the second face to enable rotation of the actuator stem relative to the rod end bearing in a second direction opposite the first direction.

6. An apparatus as defined in claim 5, wherein the locking surfaces of the serrations of the first face matably engage with the locking surfaces of the serrations of the second face to prevent rotation of the actuator stem relative to the rod end bearing in the first direction.

7. An apparatus as defined in claim 3, wherein the serrations comprise sawtooth-shaped portions.

8. An apparatus as defined in claim 1, wherein complementary-shaped portions include a first helical step on the first face and a second helical step on the second face.

9. An apparatus as defined in claim 8, wherein the first helical step forms a first shoulder and the second helical step forms a second shoulder, wherein the first and second shoulders matably engage to prevent rotation of the actuator stem relative to the rod end bearing in the first direction, and wherein the first and second shoulders disengage to allow rotation of the actuator stem relative to the rod end bearing in a second direction opposite the first direction.

10. An apparatus of claim 1, wherein the complementary-shaped portions include at least a portion of the first face having protruding members and at least a portion of the second face having recessed grooves to matably receive the protruding members of the first face so that when coupled together, the protruding members to engage the recessed grooves to prevent the actuator stem from rotating relative to the rod end bearing in the first direction.

11. An apparatus as defined in claim 1, further comprising a stud to couple the rod end bearing and the actuator stem, wherein at least a first portion of the stud is received by the first bore and at least a second portion of the stud is received by the second bore.

12. An apparatus as defined in claim 11, wherein the stud is non-threaded.

13. An apparatus as defined in claim 11, wherein the stud includes an externally threaded body that is received by the first bore of the rod end bearing and the second bore of the actuator stem.

14. An apparatus for use with a control valve actuator, the apparatus comprising:
a rod end bearing having a first end and a first threaded bore adjacent the first end;
an actuator stem having a second end and a second threaded bore adjacent the second end, the first end of the rod end bearing to engage the second end of the actuator stem, the first end of the rod end bearing defines a first face and the second end of the actuator stem defines a second face, at least a portion of the first face having a first shape and at least a portion of the second face having a second shape complementary to the first shape, the first shape and the second shape to matably engage and interlock to provide an anti-rotation lock that prevents the actuator stem and the rod end bearing from decoupling when the actuator stem is coupled to a diaphragm plate; and
a threaded stud to couple the rod end bearing and the actuator stem, at least a first portion of the threaded stud to be received by the first threaded bore and at least a second portion of the threaded stud to be received by the second bore to couple the rod end bearing and the actuator stem.

15. An apparatus of claim 14, wherein the anti-rotation lock prevents rotation of the rod end bearing and the actuator stem in one direction only relative to a longitudinal axis of the control valve actuator.

16. An apparatus of claim 14, wherein the first shape includes a first sloped edge and a first locking surface and the second shape includes a second sloped edge and a second locking surface, wherein the first and second sloped edges enable rotation of the actuator stem relative to the rod end bearing in a first rotational direction and the first and second locking surfaces prevent rotation of the actuator stem relative to the rod end bearing in a second rotational directional opposite the first rotational direction.

17. An apparatus for use with a control valve actuator, the apparatus comprising:
means for coupling a rod end bearing and an actuator stem to provide a rod end bearing and actuator stem connection for use with rotary valves actuators, the means for coupling including a first threaded end and a second threaded end opposite the first threaded end;
the rod end bearing including first means for receiving the first threaded end of the means for coupling being positioned adjacent a first end of the rod end bearing, the rod end bearing including first means for locking integrally formed with at least a portion of a first end of the rod end bearing; and
the actuator stem including second means for receiving the second threaded end of the means for coupling, the first means for receiving the first threaded end and the second means for receiving the second threaded end to coaxially align when the rod end bearing is coupled to the actuator stem, the actuator stem including second means for locking integrally formed with at least a portion of a second end of the actuator stem, the first and second means for locking to engage when the rod end bearing and the actuator stem are coupled together via the means for coupling, the first means for locking being complementary to the second means for locking, wherein the first and second means for locking engage to prevent the actuator stem from decoupling from the rod end bearing when the actuator stem is rotated in a first direction relative to the rod end bearing.

18. An apparatus of claim 17, wherein the first and second means for locking enable enabling relative rotation of the actuator stem and the rod end bearing in a second direction opposite the first direction while the first and second means for locking are in engagement when the rod end bearing and the actuator stem are coupled together via the means for coupling.

* * * * *